United States Patent [19]
Kubata et al.

[11] Patent Number: 5,097,527
[45] Date of Patent: Mar. 17, 1992

[54] FIBER TYPE WAVELENGTH CONVERTER AND MODULE

[75] Inventors: Michiru Kubata; Takafumi Uemiya; Naota Uenishi; Yasuhiro Hattori, all of Osaka, Japan

[73] Assignee: Sumitomo Electric Industries Ltd., Osaka, Japan

[21] Appl. No.: 675,803

[22] Filed: Mar. 27, 1991

[30] Foreign Application Priority Data

Mar. 27, 1990 [JP] Japan .................................. 2-79640
Dec. 27, 1990 [JP] Japan .................................. 2-408507

[51] Int. Cl.$^5$ .............................................. G02F 1/37
[52] U.S. Cl. .................................... 359/328; 359/332; 385/125; 385/143; 385/122
[58] Field of Search ............... 350/96.12, 96.14, 96.15, 350/96.29, 96.30, 96.32, 96.33, 96.34; 307/425–430

[56] References Cited

U.S. PATENT DOCUMENTS 5,011,623  4/1991  Yoshinaga et al. .......... 350/96.12 X Primary Examiner—John D. Lee
Attorney, Agent, or Firm—Cushman, Darby & Cushman

[57] ABSTRACT

A fiber type wavelength converter comprising a cladding made of a thin glass tube an inner wall of which is coated with a coupling agent, and a core which is contained in the cladding and made of a single crystal of methyl 4-hydroxybenzoate, which can convert a fundamental wave to a second harmonic effectively.

5 Claims, 3 Drawing Sheets

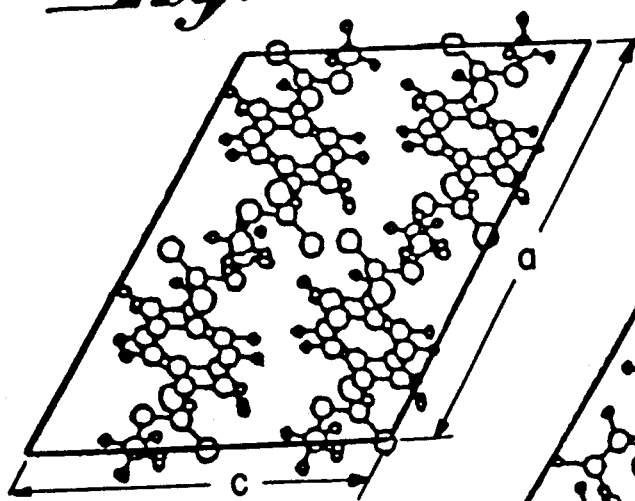
Fig. 1a.
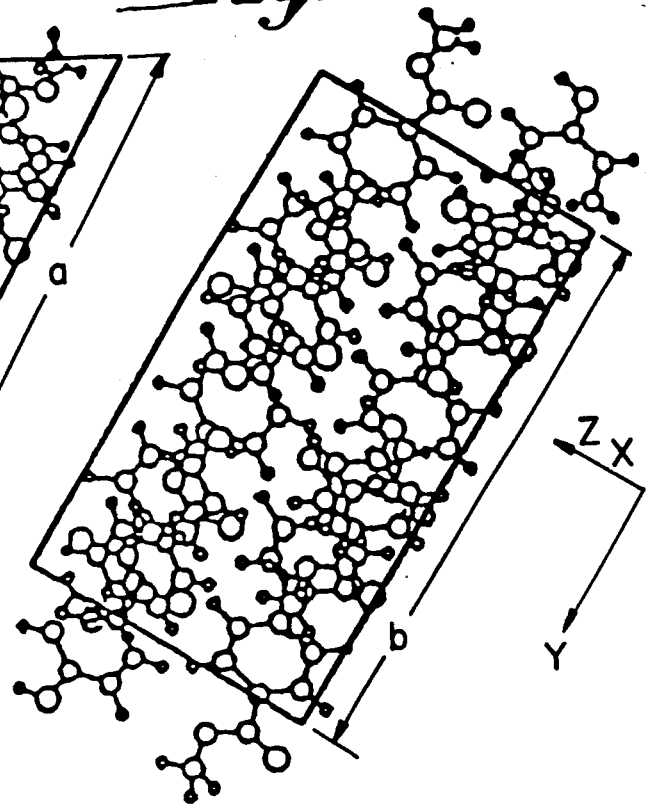
Fig. 1b.
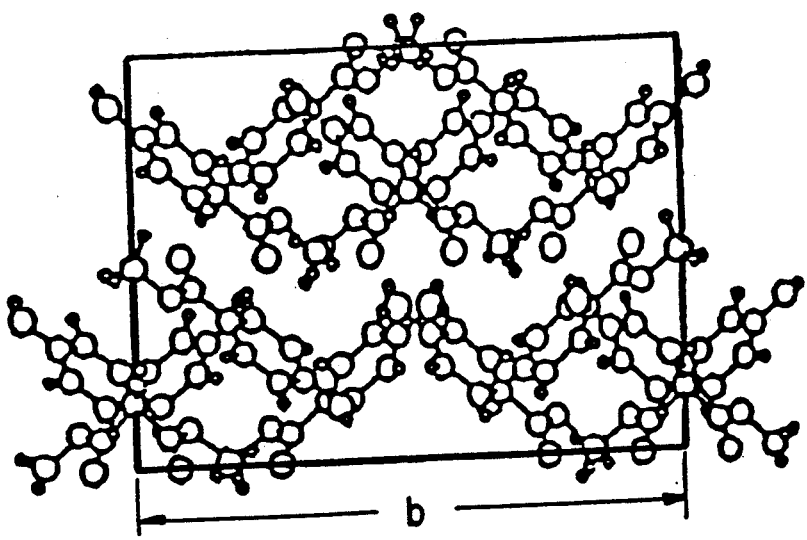
Fig. 1c.
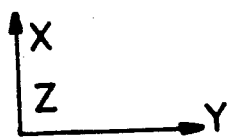
Fig. 1d.
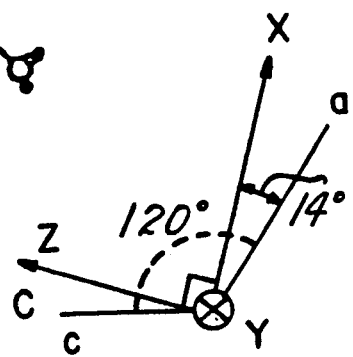

FIBER TYPE WAVELENGTH CONVERTER AND MODULE

BACKGROUND OF THE INVENTION

1. Field of the Invention

The present invention relates to a fiber type wavelength converter and module which converts a fundamental wave to a second harmonic.

2. Description of the Related Art

Hitherto, a laser beam is converted to a second harmonic by using a nonlinear optical material. As a wavelength converter which effects such wavelength conversion, a bulk crystal type one is known. However, since the bulk crystal type wavelength converter utilizes birefringence of the crystal of the nonlinear optical material for phase matching of the fundamental wave and the second harmonic, a nonlinear optical material with no birefringence cannot be used even if it has large optical nonlinearity.

Recently, a nonlinear optical material having large nonlinearity but no or a little birefringence can be used, and a fiber type wavelength converter in which phase matching of the fundamental wave and the second harmonic is easy is used. The fiber type wavelength converter comprises a cladding made of glass and a core which is in the cladding and made of a single crystal nonlinear optical material.

As the nonlinear optical material to be used as the core of the fiber type wavelength converter, one having a large nonlinear optical coefficient is preferably used so as to increase a wavelength conversion efficiency. Examples of such nonlinear optical material are organic nonlinear optical materials such as 2-methyl-4 nitroaniline (MNA), p-nitro-(2-hydroxymethylpyrolinyl)phenylene (NPP), 3,5-dimethyl-1-(4-nitrophenyl)pyrazole (PRA), 4-(N,N-dimethyl)-3-acetaminonitrobenzene (DAN), 4-nitrobenzylidene-3-acetamino-4-methoxyaniline (MNBA), etc. Japanese Parent Kokai Publication No. 279225/1989 discloses a compound including methyl 4-hydroxybenzoate as nonlinear optical materials.

In optical recording medium such as optical discs, a recording density of the medium depends on a wavelength of a light source. An upper limit of the recording density increases in inversely proportional to a square of the wavelength of the light source as the wavelength becomes shorter. For example, a semiconductor laser in the 0.8 μm band is used as a reproducing light source for the optical disc. If a semiconductor laser in the 0.4 μm band which is in a blue light region and produced from a combination of the nonlinear optical element and the semiconductor laser in the 0.8 μm band is used as the reproducing light source for the optical disc, the recording density of the optical disc can be increased by four times.

When the second harmonic is produced by using the fiber type wavelength converter, in order to increase the conversion efficiency from the fundamental wave to the second harmonic, it is necessary to coincide a polarization direction of the fundamental wave with a direction of the largest nonlinear optical coefficient of the single crystal which is used as the core of the fiber type wavelength converter. To this end, an fiber end face and a cleavage plane of the single crystal should be coincided with each other in a fiber type wavelength converter comprising a singe crystal of a compound which has good molecule orientation in the crystal and in which a direction of the largest nonlinear coefficient is in the cleavage plane such as MNA, NPP and MNBA.

However, the conventional nonlinear optical materials have large absorption in the visible light region including the 0.4 μm band. For example, since MNA, NPP and PRA have large light absorption in wavelength regions around 480 nm, 500 nm and 450 nm, they cannot generate the 0.4 μm band semiconductor laser with high output.

In the conventional fiber type wavelength converter which comprises the core made of the single crystal of the nonlinear optical material and the module comprising such converter, since not only the cleavage plane of the single crystal of the core and the fiber end face are perpendicular to each other but also molecules of the organic nonlinear optical material form hydrogen bonds together with hydroxyl groups present on an inner wall surface of the glass tube cladding, the polarization direction of the fundamental wave does not coincide with the direction of the largest nonlinear optical coefficient, so that the conversion efficiency from the fundamental wave to the second harmonic is low.

SUMMARY OF THE INVENTION

One object of the present invention is to provide a fiber type wavelength converter, which has low absorbance of light in the visible light region and generates second harmonic, in particular, second harmonic in a blue light region effectively.

Another object of the present invention is to provide a module comprising a fiber type wavelength converter, which has low absorbance of light in the visible light region, generates second harmonic, for example, second harmonic in a blue light region effectively.

According to a first aspect of the present invention, there is provided a fiber type wavelength converter comprising a cladding made of a thin glass tube (a glass capillary) an inner wall of which is coated with a coupling agent, and a core which is contained in the cladding and made of a single crystal of methyl 4-hydroxybenzoate of the formula:

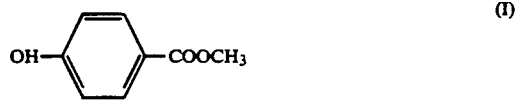

(I)

According to a second aspect of the present invention, there is provided a wavelength converting module comprising:

a fiber type wavelength converter which converts a fundamental light to a second harmonic and comprises a cladding made of a thin glass tube and a core contained in the cladding and made of a single crystal of methyl 4-hydroxybenzoate (I) having an a axis and a b axis on a plane perpendicular to a core axis, a laser beam source for generating a laser beam as the fundamental wave, and a light condensing optical system which condenses the laser beam so as to irradiate an end face of the core and polarizes the fundamental wave in a direction of the a axis or the b axis.

BRIEF DESCRIPTION OF THE DRAWINGS

FIGS. 1A-1D show three planes of the single crystal of methyl 4-hydroxybenzoate.

DETAILED DESCRIPTION OF THE PRESENT INVENTION

Figure 2:
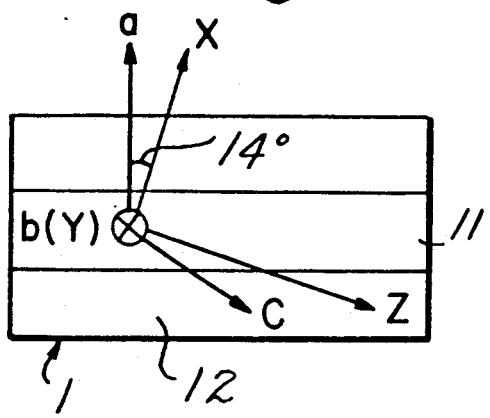
FIG. 2 shows a crystal structure of a single crystal of methyl 4-hydroxybenzoate.

The present invention is based on the following findings.

First, it has been found that when a fiber type wavelength converter comprising a core made of a single crystal of methyl 4-hydroxybenzoate is combined with a 0.8 μm band semiconductor laser which is generally used as a reproducing light source in an optical disc reproducing apparatus, a 0.4 μm band semiconductor laser as a second harmonic can be generated without absorption loss in the core.

Second, it has been found that the single crystal of methyl 4-hydroxybenzoate is a monoclinic crystal having a crystalline structure of FIG. 1, its space group is Cc, and its cleavage plane is in the a-b plane. FIG. 1A, 1B and 1C show the a-c plane, the a axis projection plane and the c axis projection plane of the single crystal of methyl 4-hydroxybenzoate, respectively.

Third, it has been also found that, as shown in FIG. 1D, the b axis of the single crystal of methyl 4-hydroxybenzoate is in the same direction as a Y dielectric principal axis, the a axis is in a direction at an angle of 14° from an X dielectric principal axis, and the a and c axes make an angle of 120°. In addition, it is found that a secondary nonlinear optical tensor d is expressed by the following formula:

$$d = \begin{pmatrix} d_{11} & d_{12} & d_{13} & 0 & d_{15} & 0 \\ 0 & 0 & 0 & d_{24} & 0 & d_{26} \\ d_{31} & d_{32} & d_{33} & 0 & d_{35} & 0 \end{pmatrix}$$

wherein, with X, Y and Z dielectric principal axes which are defined in connection with the a, b and c crystal axes, $d_{11}$ is a nonlinear optical constant which contributes to withdrawal of the second harmonic of polarized light in the X axis (X polarized light) when the X polarized light is injected as the fundamental wave, $d_{12}$ is a nonlinear optical constant which contributes to withdrawal of the second harmonic of the X polarized light when the Y polarized light is injected.

$d_{13}$ is a nonlinear optical constant which contributes to withdrawal of the second harmonic of the X polarized light when the Z polarized light is injected.

$d_{31}$ is a nonlinear optical constant which contributes to withdrawal of the second harmonic of the Z polarized light when the X polarized light is injected.

$d_{32}$ is a nonlinear optical constant which contributes to withdrawal of the second harmonic of the Z polarized light when the Y polarized light is injected.

$d_{33}$ is a nonlinear optical constant which contributes to withdrawal of the second harmonic of the Z polarized light when the Z polarized light is injected.

$d_{24}$ is a nonlinear optical constant which contributes to withdrawal of the second harmonic of the Y polarized light when the Y and Z polarized light is injected.

$d_{15}$ is a nonlinear optical constant which contributes to withdrawal of the second harmonic of the X polarized light when the X and Z polarized light is injected.

$d_{26}$ is a nonlinear optical constant which contributes to withdrawal of the second harmonic of the Y polarized light when the X and Y polarized light is injected.

$d_{35}$ is a nonlinear optical constant which contributes to withdrawal of the second harmonic of the Z polarized light when the X and Z polarized light is injected.

The above nonlinear optical constants are determined from the X-ray structural analysis of the single crystal of methyl 4-hydroxybenzoate. The data are shown in the following Table.

TABLE

| Non linear optical constant | pm/V |
|---|---|
| $d_{11}$ | 14 |
| $d_{12}$ | 22 |
| $d_{13}$ | 0.01 |
| $d_{15}$ | 0.001 |
| $d_{24}$ | 0.001 |
| $d_{26}$ | 22 |
| $d_{31}$ | 0.001 |
| $d_{32}$ | 0.001 |
| $d_{33}$ | 0.0001 |
| $d_{35}$ | 0.01 |

From the Table, it is understood that, among the nonlinear optical constants, $d_{11}$, $d_{12}$ and $d_{26}$ are large.

When a fiber type wavelength converter 1 comprising a core 11 made of methyl 4-hydroxybenzoate is formed, a single crystal of methyl 4-hydroxybenzoate is orientated so that the a and b axes are in a plane perpendicular to the core axis. When the fundamental wave polarized in the a axis direction or the b axis direction of the single crystal of methyl 4-hydroxybenzoate is injected, the second harmonic can be obtained by utilizing 91% of $d_{11}$ or 97% of $d_{12}$. When a light polarized in one of the a axis direction and the b axis direction is used, the second harmonic can be obtained in a single mode effectively.

To utilize the nonlinear optical constant $d_{26}$, the fundamental wave polarized in the X and Y directions should be used. But, it is impossible to generate the second harmonic in the single mode because of anisotropy of the refractive index of methyl 4-hydroxybenzoate.

Figure 3:
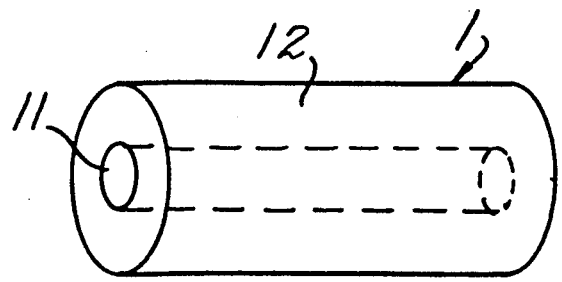
FIG. 3 is a perspective view of an example of the fiber type wavelength converter of the present invention, FIG. 4 schematically illustrates a surface modified inner wall of the thin glass tube.

FIG. 3 shows an example of the fiber type wavelength converter 1 of the present invention, which comprises a core 11 and a cladding 12 consisting of a thin glass tube.

Since the wavelength converter 1 of the present invention has the core 11 made of methyl 4-hydroxybenzoate which absorbs little light in the visible light region, a combination of the wavelength converter 1 and the 0.8 μm band semiconductor laser can generate the 0.4 μm band semiconductor laser as the second harmonic without absorption loss.

In the fiber type wavelength converter of the present invention, the inner wall of the glass tube cladding 12 is coated with the coupling agent, whereby the cleavage plane of the methyl 4-hydroxybenzoate single crystal coincides with the fiber end face so that the polarization direction of the fundamental wave and the direction of the maximum nonlinear optical constant substantially coincide with each other. Therefore, the conversion efficiency from the fundamental wave to the second harmonic can be increased, and the wavelength conversion is carried out effectively.

The wavelength converter of the present invention may be produced by any of various conventional methods. For example, the inner wall of the thin glass tube as the cladding is coated with the coupling agent and then the methyl 4-hydroxybenzoate single crystal is filled in the glass tube.

By the coating of the inner wall of the thin glass tube with the coupling agent, hydroxyl groups present on the inner wall bond with the coupling agent, and a molecular layer of the coupling agent is formed on the inner wall so that the surface of the inner wall is modified.

For example, when a silane coupling agent having three lipophilic groups and one ethoxy group is used as the coupling agent, a lipophilic layer is formed on the inner wall of the glass tube, whereby a hydrophilic surface is converted to a lipophilic surface.

Accordingly, the glass surface can be freely modified by selecting a kind of the coupling agent.

Since an interaction at an interface on the inner wall is changed by the modification of the inner wall surface, the direction of the cleavage plane of the single crystal formed in the glass tube having the modified inner wall surface is different from that of a single crystal formed in a glass tube having a non-modified inner wall surface.

Figure 4:
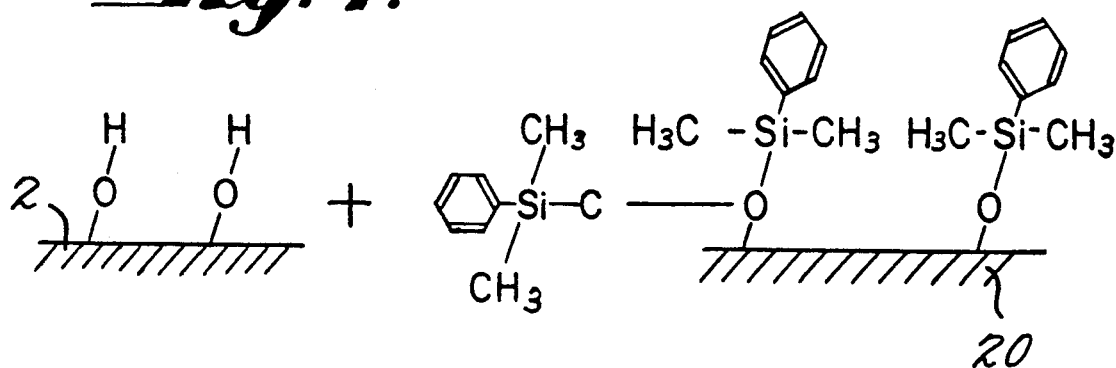

For example, monochlorosilane is used as the coupling agent, it bonds with the hydroxyl groups on the inner wall and, as shown in FIG. 4, each substituent of the coupling agent molecule stands in a perpendicular direction from the surface 20 of the inner wall so that the coupling agent form a molecular layer. In such case, the molecules of the single crystal formed in the glass tube are aligned in the same direction as that of the substituents of the coupling agent.

Therefore, in the fiber type wavelength converter 1 of the present invention, it is possible to coincide the cleavage plane of the methyl 4-hydroxybenzoate single crystal with the fiber end face by the coating of the inner wall surface of the glass tube with the coupling agent, whereby the polarization direction of the fundamental wave and the direction of the maximum nonlinear optical constant coincide with each other and the fundamental wave is effectively converted to the second harmonic.

The inner wall of the glass tube can be coated with the coupling agent by various methods. For example, a solution of the coupling agent is contacted with the inner wall for a certain period of time, or the glass tube is dipped in the solution of the coupling agent for a certain period of time.

The glass tube is made of heat resistant glass which has no nonlinear optical effect, such as quartz glass, lead glass or soda glass. The thin glass tube preferably has an inner diameter of 1 to 3 μm.

As the coupling agent, preferably a compound of the formula:

$$R_n M X_{m-n} \qquad (II)$$

wherein R is a substituent having a hydroxyl group and a property different from a glass surface, M is silicon, titanium or aluminum, X is a substituent having a reactivity with a hydroxyl group on a glass surface, m is a valency of M, and n is an integer larger than 0 (zero) and smaller than m.

Specific examples of the substituent R are alkyl, alkenyl and alkynyl groups (e.g. methyl, ethyl, propyl, isopropyl, butyl, vinyl, 1-propenyl, allyl, isopropenyl, ethynyl, etc.), alicyclic groups (e.g. cyclopropyl, cyclopentyl, cyclohexyl, 1-cyclohexenyl, etc.), aromatic hydrocarbon groups (e.g. phenyl, tolyl, xylyl, benzyl, naphthyl, etc.), carboxylic acid groups or their ester (e.g. methoxycarbonyl, acetoxy, etc.), acyl groups (e.g. acetyl, propionyl, butyryl, acrylonitrile, benzoyl, etc.), groups having a nitrogen atom (e.g. amino groups, amido groups, etc.), heterocyclic groups (e.g. 2-furyl, 2-pyrrole, 2-pyridyl, etc.), a hydroxyl group, an epoxy group, a mercapto group, a cyano group, an isocyano group, a cyanate group, a thiocyanate group, a nitro group, a halogen atom, and the like. To these groups, any other substituent group may be bonded.

Specific examples of the substituent X are halogen atoms (e.g. chlorine, bromine, etc.), a hydrogen atom, a hydroxyl group, a methoxy group, an ethoxy group, etc.

Among the compounds (II), silane coupling compounds which are represented by the formula (II) wherein M is silicon are preferred. In particular, a monochlorosilane compound having at least one substituent having a similar structure to the organic nonlinear optical material is preferred.

The methyl 4-hydroxybenzoate single crystal may be prepared by, for example, (i) a melt method which comprises filling a melt of methyl 4-hydroxybenzoate in the thin glass tube by the capillary phenomena, cooling and crystallizing methyl 4-hydroxybenzoate, remelting the crystal in the thin glass tube, and then gradually cooling the glass tube from one end to the other to grow the single crystal of methyl 4-hydroxybenzoate in the glass tube, or (ii) a so-called solution method which comprises quenching one end of the heated thin glass tube containing a solution of methyl 4-hydroxybenzoate to precipitate polycrystal as a seed crystal and then gradually cooling the glass tube from one end to the other to grow the single crystal of methyl 4-hydroxybenzoate from the polycrystal.

Now, the wavelength converting module of the present invention will be explained. In this module, the laser beam as the fundamental wave is generated from the laser beam source. The laser beam is condensed and polarized in the a or b axis direction of the methyl 4-hydroxybenzoate single crystal which constitutes the core of the fiber type wavelength converter by the light condensing system. Then, the polarized laser beam is irradiated on an incoming face of the core of the fiber type wavelength converter.

Therefore, the fundamental laser beam can be converted to the second harmonic by utilizing $d_{11}$ or $d_{12}$ among the nonlinear optical constants of the single crystal of methyl 4-hydroxybenzoate.

Since methyl 4-hydroxybenzoate absorbs substantially no light around 400 nm, the wavelength converter assembled in the wavelength converting module of the present invention does not absorb the second harmonic in the blue light region.

Figure 5:
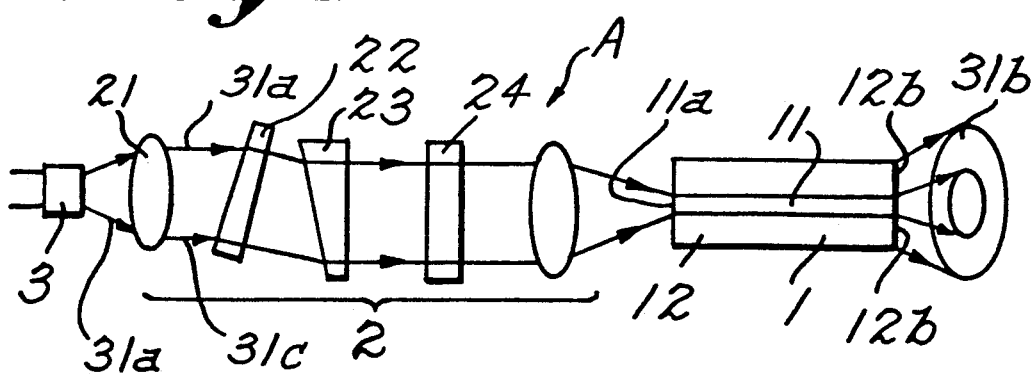
FIG. 5 is a schematic view of an example of the wavelength converting module of the present invention.

FIG. 5 illustrates an example of the wavelength converting module A of the present invention. The wavelength converting module A comprises a fiber type wavelength converter 1, a light condensing optical system 2 and a laser beam source 3.

The fiber type wavelength converter 1 comprises a core 11 made of the methyl 4-hydroxybenzoate single crystal and a cladding 12 made of glass. The a and b axes of the methyl 4-hydroxybenzoate single crystal are in the directions perpendicular to the core axis.

The light condensing optical system 2 is provided between the fiber type wavelength converter 1 and the laser beam source 3 and comprises a collimetry lens 21, a pair of anamorphic prisms 22, 23, a $\lambda/2$ plate 24 and a condensing lens 25 in this order from the laser beam side to the fiber type wavelength converter side.

As the laser beam source, any laser beam source that can generate the fundamental wave for the required second harmonic, such as the semiconductor laser may be used.

With the wavelength converting module A of FIG. 5, the laser beam 31a generated from the laser beam source 3 is paralleled by the collimetry lens 21. Then, the beam passes through the anamorphic prisms 22, 23 and the $\lambda/2$ plate 24, condensed by the condensing lens 25 and then irradiated on an incident end face of the core 11 of the fiber type wavelength converter 1.

When the laser beam 31a is polarized in the direction of the a axis or the b axis of the methyl 4-hydroxybenzoate single crystal of the core 11 by rotating the $\lambda/2$ plate 24, the light which has been condensed and polarized in the direction of the a axis or the b axis is irradiated on the incident end face 11a of the core 11. In this case, by utilizing the large nonlinear optical constant $d_{11}$ or $d_{12}$ of the methyl 4-hydroxybenzoate single crystal, the laser beam 31a as the fundamental wave is converted to the second harmonic at a high wavelength conversion efficiency to generate a ring form second harmonic 31b from the outgoing end face 12b of the cladding 12 of the fiber type wavelength converter 1.

The laser beam 31a generated by the laser beam source 3 is not limited. To generate the second harmonic having a wavelength in the blue light region, the laser beam having a wavelength of around 800 nm is used. In such case, since the methyl 4-hydroxybenzoate single crystal forming the core 11 of the fiber type wavelength converter 1 absorbs substantially no light having a wavelength of around 400 nm, the second harmonic 31b in the blue light region is effectively generated.

The fiber type wavelength converter to be used in the wavelength converting module of the present invention may be prepared by any of conventional methods. As described above, it is possible to use a surface-modified glass tube an inner wall surface of which is coated with the coupling agent. Thereby, the crystal orientation is controlled as described above.

Alternatively, the methyl 4-hydroxybenzoate single crystal can be grown in the glass tube with controlling the crystal orientation.

For example, methyl 4-hydroxybenzoate is kept in a molten state in a heating furnace which is heated at a temperature slightly higher than the melting point of methyl 4-hydroxybenzoate, for example at 135° C. Then, one end of the glass tube is dipped in a melt of methyl 4-hydroxybenzoate so as to fill the glass tube by the capillary phenomenon. Then, the glass tube is quenched to solidify methyl 4-hydroxybenzoate in the glass tube and form a fiber.

Figure 6:
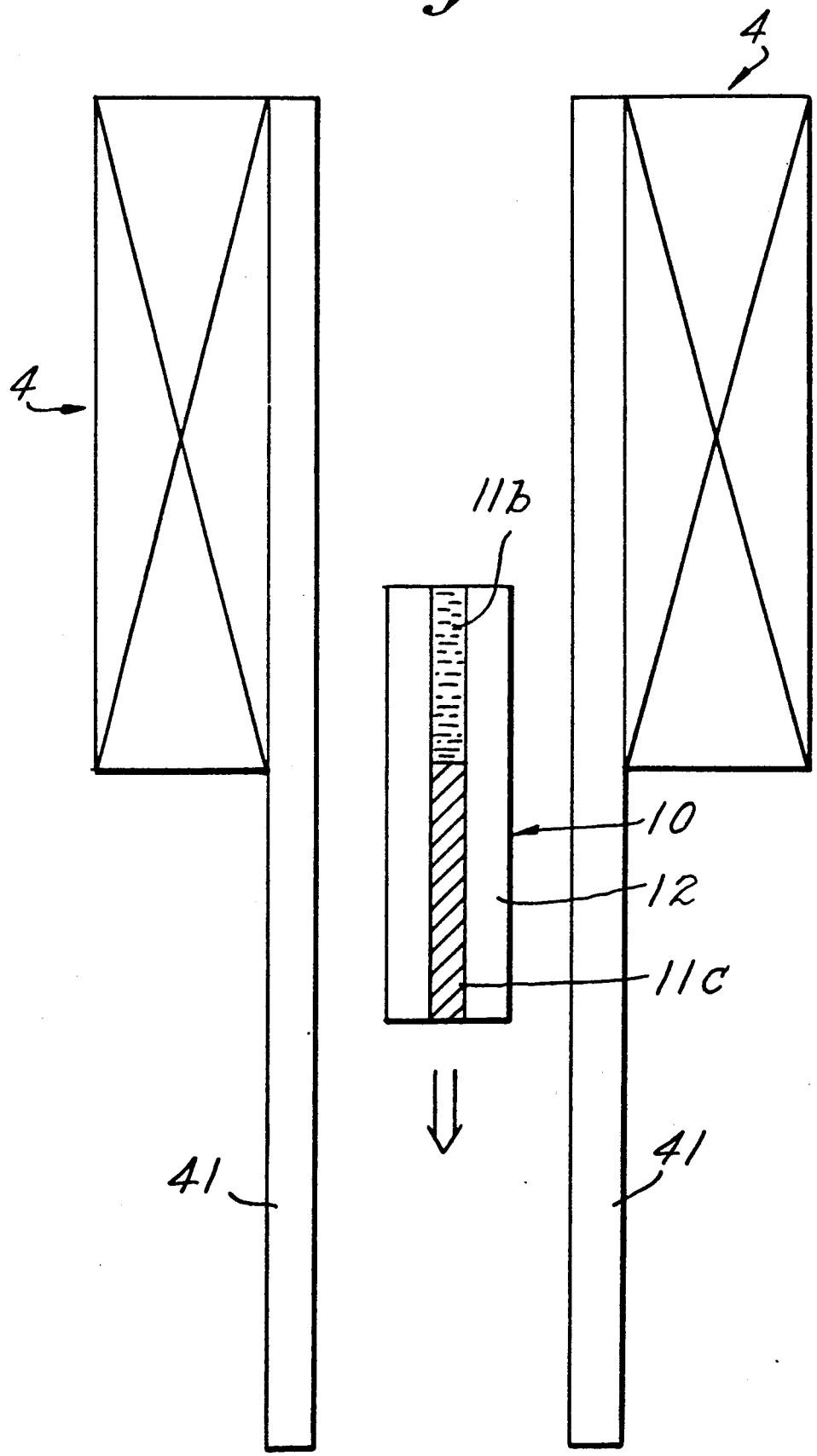
FIG. 6 illustrates one step in a production method of the fiber type wavelength converter used in the wavelength converting module of the present invention.

Then, the glass fiber containing methyl 4-hydroxybenzoate is placed in a heating furnace heated at a temperature higher than the melting point of methyl 4-hydroxybenzoate to remelt methyl 4-hydroxybenzoate. Then, as shown in FIG. 6, an electrode 41 is placed outside a furnace which is kept at a temperature lower than the melting point of methyl 4-hydroxybenzoate. Then, the fiber 10 is pulled out from one end of the furnace, for example, a lower end in FIG. 6, with applying an electrostatic field of at least 1 kV/cm in a direction perpendicular to the core axis of the fiber 10 to grow the single crystal 11c of methyl 4-hydroxybenzoate from one end of the fiber.

Thereafter, a part of the fiber 10 in which the methyl 4-hydroxybenzoate single crystal 11c is formed is cut with a fiber cutter and the like to produce the fiber type wavelength converter 1.

Since the methyl 4-hydroxybenzoate single crystal of at least 50 mm in length is formed in the thin glass fiber by the above method, the wavelength converter 1 has a sufficient length.

The crystal orientation of the grown single crystal of methyl 4-hydroxybenzoate is such that the a and b axes are in a plane perpendicular to the core axis as shown in FIG. 2. This is because, since molecules of the nonlinear optical material such as methyl 4-hydroxybenzoate has a large dipole moment, they are orientated in accordance with the electrostatic field which is applied when methyl 4-hydroxybenzoate is in a liquid state, and when methyl 4-hydroxybenzoate is crystallized with keeping the orientated state, the methyl 4-hydroxybenzoate single crystal having the a and b axes in the plane perpendicular to the core axis is obtained.

The glass tube used in the above method is the same as described above. As the furnace 4 for remelting methyl 4-hydroxybenzoate, a Bridgeman furnace which can apply the electrostatic field as shown in FIG. 6 is preferably used.

In the above method, the fiber 10 is pulled at a rate of about 1 mm/hr. in view of the quality of methyl 4-hydroxybenzoate single crystal.

PREFERRED EMBODIMENTS OF THE INVENTION

The present invention will be illustrated in detail by following Examples.

Example 1

In a reservoir of a glass made growing apparatus comprising a PYREX (a trademark of Corning Glass) glass capillary tube having an inner diameter of 2.5 μm, an outer diameter of 1 μm and a length of 10 cm at a lower part and a reservoir having an inner diameter of 4 mm, an outer diameter of 6 mm and a length of 10 cm at an upper part, a 5% by weight solution of phenyldimethylchlorosilane in cyclohexane and an upper end of the reservoir was closed. The whole apparatus was heated to 85° C. to inject the solution in the capillary tube by the vapor pressure of cyclohexane and kept at the same temperature for 3 hours. Then, the upper end of the reservoir was opened, the solution was removed, and the capillary tube was dried to prepare a glass capillary tube having a modified inner wall.

Separately, methyl 4-hydroxybenzoate was molten and filled in an ampoule having an inner diameter of 6 mm to a height of 5 mm from an ampoule bottom.

The modified glass capillary tube was cut to a length of 30 mm and dipped in methyl 4-hydroxybenzoate melt, and methyl 4-hydroxybenzoate melt was filled in the capillary tube by evacuating the ampoule with a vacuum pump.

Then, the ampoule and the capillary tube were heated to 135° C. by a heating furnace and pulled out of the furnace at a rate of 1 mm/hr. whereby methyl 4-hydroxybenzoate melt in the capillary tube was cooled from one end to the other so as to grow a methyl 4-hydroxybenzoate single crystal.

After growing the methyl 4-hydroxybenzoate single crystal and forming a predetermined length of the single crystal region, the growing apparatus was removed from a heating zone of the furnace.

Thereafter, the capillary tube was removed from the ampoule and observed with a polarization microscope to find that the methyl 4-hydroxybenzoate single crystal was grown over a length of 15 mm. From this single crystal region, a fiber type wavelength converter having a length of 5 mm was cut out, and its end face was observed to find that a cleavage plane of the methyl 4-hydroxybenzoate single crystal was present in parallel with the fiber end face and the a and b axes of the single crystal were in a plane perpendicular to the core axis.

From the above single crystal region, a fiber type wavelength converter having a length of 10 mm was cut out and combined with a laser beam source and a light condensing optical system to assemble a wavelength converting module as shown in FIG. 5.

From the laser beam source, a semiconductor laser beam having a wavelength of 860 nm was irradiated as a fundamental wave. The semiconductor laser beam was changed to a parallel beam with a collimetry lens and passed through a pair of anamorphic prisms and a λ/2 plate. Then, the beam was condensed by a condensing lens and irradiated onto the core part of the incident end face of the fiber type wavelength converter. As the result, a second harmonic which had a wavelength of 430 nm and was polarized in the direction of the a axis of the methyl 4-hydroxybenzoate single crystal was outgone from the cladding part of the outgoing end face of the fiber type wavelength converter.

Example 2

In an ampoule having an inner diameter of 6 mm, methyl 4-hydroxybenzoate melt was filled to a height of 5 mm from an ampoule bottom.

In the ampoule, a PYREX (a trademark of Corning Glass) glass capillary tube having an inner diameter of 2.5 μm, an outer diameter of 1 mm and a length of 30 mm was inserted and filled with methyl 4-hydroxybenzoate melt by evacuating the ampoule by the vacuum pump.

Then, the ampoule and the capillary glass tube were heated in the growing furnace 41 of FIG. 6 at 135° C. and pulled out from the lower end of the furnace 41 at a rate of 3 mm/hr. with applying an electrostatic field of 2.5 eV/cm to cool methyl 4-hydroxybenzoate melt in the capillary glass tube from its lower end to the upper end, whereby the methyl 4-hydroxybenzoate single crystal was grown.

After growing the methyl 4-hydroxybenzoate single crystal and forming a predetermined length of the single crystal region, the whole ampoule was removed from a heating zone of the furnace and cooled.

Thereafter, the capillary tube was removed from the ampoule and observed with a polarization microscope to find that the methyl 4-hydroxybenzoate single crystal was grown over a length of 15 mm.

From this single crystal region, a fiber type wavelength converter having a length of 5 mm was cut out, and its end face was observed to find that a cleavage plane of the methyl 4-hydroxybenzoate single crystal was present in parallel with the fiber end face and the a and b axes of the single crystal were in a plane perpendicular to the core axis.

Example 3

In the same manner as in Example 1, the inner wall of the capillary glass tube was modified and the glass tube was filled with methyl 4-hydroxybenzoate melt.

Then, in the same manner as in Example 2, the methyl 4-hydroxybenzoate single crystal was grown in the capillary glass tube.

Thereafter, the capillary tube was removed from the ampoule and observed with a polarization microscope to find that the methyl 4-hydroxybenzoate single crystal was grown over a length of 15 mm.

From this single crystal region, a fiber type wavelength converter having a length of 5 mm was cut out, and its end face was observed to find that a cleavage plane of the methyl 4-hydroxybenzoate single crystal was present in parallel with the fiber end face and the a and b axes of the single crystal were in a plane perpendicular to the core axis.

By the procedures of Example 3, the fiber type wavelength converter was produced at an yield of two times larger than in Examples 1 and 2.

What is claimed is:

1. A fiber type wavelength converter comprising a cladding made of a thin glass tube an inner wall of which is coated with a coupling agent, and a core which is contained in the cladding and made of a single crystal of methyl 4-hydroxybenzoate of the formula:

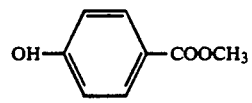
(I)

2. The fiber type wavelength converter according to claim 1, wherein said coupling agent is a compound of the formula:

$$R_nMX_{m-n} \tag{II}$$

wherein R is a substituent having a hydroxyl group and a property different from a glass surface, M is silicon, titanium or aluminum, X is a substituent having a reactivity with a hydroxyl group on a glass surface, m is a valency of M, and n is an integer larger than 0 (zero) and smaller than m.

3. The fiber type wavelength converter according to claim 1, wherein said thin glass tube has an inner diameter of 1 to 3 μm.

4. A wavelength converting module comprising a fiber type wavelength converter which converts a fundamental light to a second harmonic and comprises a cladding made of a thin glass tube and a core contained in the cladding and made of a single crystal of methyl 4-hydroxybenzoate of the formula:

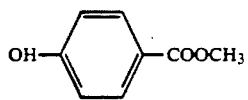 (I)

having an a axis and a b axis on a plane perpendicular to a core axis, a laser beam source for generating a laser beam as the fundamental wave, and a light condensing optical system which condenses the laser beam so as to irradiate an end face of the core and polarizes the fundamental wave in a direction of the a axis or the b axis.

5. The wavelength converting module according to claim 4, wherein said thin glass tube has an inner diameter of 1 to 3 μm.

* * * * *